(12) United States Patent
Takahashi

(10) Patent No.: US 8,856,377 B2
(45) Date of Patent: Oct. 7, 2014

(54) FIELD COMMUNICATION TEST DEVICE AND FIELD COMMUNICATION TEST SYSTEM USING THE SAME

(75) Inventor: Hiroyuki Takahashi, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 1098 days.

(21) Appl. No.: 12/570,336

(22) Filed: Sep. 30, 2009

(65) Prior Publication Data
US 2010/0082128 A1 Apr. 1, 2010

(30) Foreign Application Priority Data
Sep. 30, 2008 (JP) .................. 2008-252249

(51) Int. Cl.
*G05B 9/02* (2006.01)
(52) U.S. Cl.
USPC ........... 709/232; 709/229; 709/230; 709/231; 714/31; 714/34; 714/47.1
(58) Field of Classification Search
USPC ......... 714/25, 30, 36, 738, 742; 709/223, 224
See application file for complete search history.

(56) References Cited

U.S. PATENT DOCUMENTS

| | | | | |
|---|---|---|---|---|
| 7,665,002 B1 * | 2/2010 | White et al. | | 714/733 |
| 2003/0100299 A1 * | 5/2003 | Ko et al. | | 455/423 |
| 2004/0199351 A1 * | 10/2004 | Ott et al. | | 702/108 |
| 2005/0278147 A1 * | 12/2005 | Morton et al. | | 702/183 |
| 2006/0083084 A1 * | 4/2006 | Yano et al. | | 365/200 |
| 2007/0006154 A1 * | 1/2007 | Yang et al. | | 717/124 |

FOREIGN PATENT DOCUMENTS

| | | |
|---|---|---|
| JP | 04107036 A | 4/1992 |
| JP | 5-260568 A | 10/1993 |
| JP | 2007287153 A | 11/2007 |

OTHER PUBLICATIONS http://see.stanford.edu/materials/icspmcs106a/33-debugging.pdf "Debugging"—Nov. 2007 Stanford University.*
http://www.dwarfstd.org/doc/Debugging%20using%2ODWARF.pdf "Introduction to the Dwarf Debugging Format"—Dwarfs TD, Feb. 2007.*
Japanese Office Action dated Aug. 6, 2012 issued in corresponding Japanese Patent Application No. 2008-252249.

* cited by examiner

*Primary Examiner* — Randy Scott
(74) *Attorney, Agent, or Firm* — Sughrue Mion, PLLC

(57) ABSTRACT

A field communication test device is provided on a field bus, to which a plurality of field equipments are connected, and also connected to a debug network to apply a communication test to respective field equipments. The field communication test device transmits/receives cooperation data, which is used to apply the communication test in cooperation with each other, to and from other field communication test device provided on the field bus, via the debug network, and transmits test data for the communication test to the respective field equipments via the field bus base on the cooperation data.

8 Claims, 7 Drawing Sheets

FIELD COMMUNICATION TEST DEVICE AND FIELD COMMUNICATION TEST SYSTEM USING THE SAME

TECHNICAL FIELD

The present disclosure relates to a field communication test device for applying a communication test between respective field equipments connected to a field bus and a field communication test system using the same and, more particularly, to facilitate the application of various tests.

RELATED ART

In the recent plant control system, in many cases various field equipments such as differential pressure gauge, flowmeter, thermometer, actuator, controller, and the like (referred to "field equipments" hereinafter) are connected to the field bus, which is of the two-wired bus power feeding type such as Foundation Fieldbus FF-H1 (registered trademark), PROFI-BUS-PA (registered trademark), or the like being laid in the plant, such that these field equipments hold mutually the data communication via the field bus.

As the related art Literature concerning the test system that carried out the communication test of the field equipments connected to such field bus, there is Patent Literature 1 described as follows. In this Patent Literature 1, the technology to detect the fault on the field bus by the loop-back test and enhance reliability of the transmission line containing respective field equipments is set forth.

[Patent Literature 1] JP-A-5-260568

FIG. 6 is a configurative view showing an example of a field communication test system in the related art. This field communication test system is built up by a test device 1 for carrying out the communication test of the test subject equipment, a bus monitor equipment 2 for monitoring data that flow through a field bus 3, the field bus 3, and a field equipment 4 serving as a subject of test.

In FIG. 6, the test device 1, the bus monitor equipment 2, and the field equipment 4 are connected to the common field bus 3, and these equipments can hold the communication mutually via the field bus 3.

The test device 1 holds the data communication with the field equipment 4 in conformity to the protocol for a predetermined field bus, and carried out the communication test. Concretely, the test device 1 holds protocol information for the field bus to hold the communication with other equipment being connected to the field bus 3, and converts the test data into the field bus data based on the protocol information in carrying out the communication test.

Also, the test device 1 is constructed by a communicating portion such as a field bus interface, or the like, an operation controlling portion, and a memory portion. This communicating portion holds the data communication with the field equipment 4 via the field bus 3. This operation controlling portion controls operations of respective functions of executing the communication test by sending the data in conformity to the specification of the protocol, and the like. This memory portion stores the test case or test data for the communication test and the application, the protocol information for the field bus, and the like. (Here, the test case mentioned in this application denotes the test tool for verifying operations of the system, the equipment, the software, etc. As the test case, for example, there are preconditions such as system environments, etc., operations applied to the subject of test, set information for the test in which the results produced by the operations correspondingly are recited, program/script for the software test, and the like. Such test case is used to verify whether or not (the program of) the field equipment 4 as the subject of test is working correctly.)

The bus monitor equipment 2 corresponds to the equipment that acquires contents of the communication being held between the field equipment 4 as the subject of test and the test device 1 and monitors the data that flows through the field bus 3. Concretely, the bus monitor equipment 2 is constructed by a communicating portion as a field bus interface, an operation controlling portion, a display portion, and the like. This communicating portion holds the data communication via the field bus 3. This operation controlling portion controls operations of respective functions of converting the data acquired from the field bus 3 into display data and displaying the data, and the like. This display portion is composed of LCD (Liquid Crystal Display) that displays the data acquired from the field bus 3, or the like.

The field equipment 4 holds the data communication with the test device 1 via the field bus 3. Also, the field equipment 4 has sensors such as differential pressure gauge, flowmeter, thermometer, etc., and has a function of transmitting measured data to other field equipments (not shown) connected to the field bus 3. In this case, assume that the field equipment 4 and other field equipments (not shown) also contain actuator, controller, etc. in addition to these sensors.

An operation of the field communication test system constructed in this manner in the related art will be explained hereunder. The test device 1 executes the test case stored in the memory portion, and establishes the data communication with the field equipment 4 (starts the test). At this time, the test device 1 converts the test data into the data for the field bus in conformity to the protocol for the field bus, and executes the communication test.

FIG. 7 is an explanatory view of an operation of the test device 1 in FIG. 6. The test device 1 in the related art holds the communication through the protocol stack in the hierarchical structure. That is, the data received through the physical layer such as the field bus interface, or the like are transferred to the test case through the protocol stack for the field bus, as shown in FIG. 7.

Concretely, the test device 1 converts the data received via the field bus 3 into the test data, based on the protocol information for the field bus. Otherwise, the test device 1 converts the test data into the data for the field bus 3, and transmits the data to the subject of test.

As the communication test that the test device 1 carries out, there are a normal communication test, an abnormal communication test, etc. The normal communication test indicates that the communication for transmitting/receiving the data whose data specification is specified in advance by the protocol in accordance with a predetermined sequence should be tested.

When the normal communication test is carried out, the test device 1 transmits the data specified by the protocol to the field equipment 4 as test data. The field equipment 4 transmits the data prepared in conformity to the protocol to the test device 1, based on the test data received via the field bus 3.

The test device 1 decides whether or not response data to the test data from the field equipment 4 correspond to the data prepared in conformity to the protocol. Then, the test device 1 decides whether a communication operation of the field equipment 4 is normal or abnormal.

The abnormal communication test indicates that the communication that does not meet the specification specified by the protocol should be tested. Normally, the operation of the field equipment 4 taken when the abnormal data produced by the error in fitting the equipment, the garbling of data due to the application of noise, or the like is received should be tested.

When the abnormal communication test is carried out, the work needed to superpose manually the noise on a signal line of the field bus 3 must be done to generate the abnormal data. This is because the test device 1 in the related art is constructed on the assumption that such device holds the normal communication with other equipment and thus the data communication other than the normal communication is not taken into account.

Concretely, the operator carries out the abnormal communication test by executing the work to cut a data line at an adequate timing, or the like, while grasping the data flowing through the field bus 3 that is displayed on bus monitor equipment 2.

The field equipment 4 transmits the data, which are to be transmitted when the previously decided abnormal data is received, to the test device 1 via the field bus 3, based on the abnormal data received via the field bus 3.

Then, the test device 1 decides whether or not the response data responding to the abnormal data from the field equipment 4 correspond to the previously decided response data. Then, the test device 1 decides whether the communication operation of the field equipment 4 is normal or abnormal.

The bus monitor equipment 2 acquires the communication data between the test device 1 and the field equipment 4 via the field bus 3, and displays a state of the communication data flowing through the field bus 3. Also, the bus monitor equipment 2 acquires the communication data via the field bus 3, and stores this data in the storing portion as the debug data produced when the field equipment 4 does not operate correctly.

In this manner, the field communication test system in the related art can carry out the communication test of the field equipment 4 connected to the field bus 3.

However, the field communication test system in the related art is constructed on the assumption that the test device 1 holds the normal communication with other equipment. Therefore, such a problem existed that, when the data for the abnormal communication test should be produced, the work needed to superpose the noise on the data line must be done manually and the testing operation is inconvenient and ineffective.

Concretely, as shown in FIG. 7, the test device 1 in the related art can hold the communication only in compliance with the protocol for the field equipment, and no change can be applied to raw data that is exchanged with the physical layer. Therefore, the work needed to superpose the noise on the data line must be done manually. For example, when the data destroyed by the noise are to be reproduced as the abnormal communication test, the work needed to superpose the noise on the bus, or the like must be done manually at an adequate timing. As a result, the testing operation is inconvenient and ineffective.

Also, the field communication test system in the related art had such a problem that the communication test assuming the communication between a plurality of field equipments cannot be carried out. In the field control system, the defect caused only in a particular sequence or at a particular timing in the communication between a plurality of field equipments, or the like may be possible. In the test device 1 of the field communication test system in the related art, plural pieces of test data cannot be transmitted sequentially. Therefore, such a problem existed that it is difficult to carry out the communication test assuming the communication between a plurality of field equipments.

SUMMARY

Exemplary embodiments of the present invention provide a field communication test device capable of carrying out a wide variety of communication tests easily and enhancing a quality of a test subject equipment, and a field communication test system using the same.

According to a first aspect of the invention, a field communication test device is provided on a field bus, to which a plurality of field equipments are connected, and also connected to a debug network to apply a communication test to respective field equipments. The field communication test device transmits/receives cooperation data, which is used to apply the communication test in cooperation with each other, to/from other field communication test device provided on the field bus, via the debug network, and transmits test data for the communication test to the respective field equipments via the field bus base on the cooperation data.

According to a second aspect of the invention, the field communication test device according to the first aspect of the invention, comprises;

a first communication portion which holds data communication with the other field communication test device via the debug network, a second communication portion which holds data communication for the communication test with respective field equipments via the field bus, a storing portion which stores a test case used to apply at least any one of a normal communication test in which the field communication test device operates as the field equipments that operate normally and transmits the test data for the communication test, a particular sequence/timing test in which the test data for the communication test is transmitted in a sequence or at a predetermined timing in communications between the plurality of field equipments, and an abnormal communication test in which the field communication test device operates as the field equipments that operate not to meet the specification specified in advance by the protocol of each field equipment and transmits the test data for the communication test, and an operation controlling portion which transmits/receives the cooperation data by controlling the first communication portion in accordance with each test case, and transmits data for the communication test to respective field equipments as a subject of test by controlling the second communication portion based on the cooperation data.

According to a third aspect of the invention, in the field communication test device according to the second aspect of the invention, the operation controlling portion transmits/receives the cooperation data containing at least any one of time difference information, sequence information in which a transmitting sequence of test data is decided, and synchronizing information by controlling the first communication portion such that the field communication test device applies the particular sequence/timing test while cooperating with the other field communication test device, and the operation controlling portion transmits the test data at a time interval while cooperating with the other field communication test device based on the time difference information received via the debug network, and/or transmits the test data while cooperating with the other field communication test device based on the sequence information received via the debug network, and/or transmits the test data at a same timing while cooperating with the other field communication test device based on the synchronizing information received from the other field communication test device via the debug network.

According to a fourth aspect of the invention, a field communication test system comprises:

a debug network; and at least one field communication test device according to the first aspect of the invention.

According to a fifth aspect of the invention, the field communication test system according to the fourth aspect of the invention, further comprises:

a test commanding device which sets a plurality of test cases of the communication test, and transmits data containing the test cases to respective field communication test devices via the debug network.

According to a sixth aspect of the invention, in the field communication test system according to the fifth aspect of the invention, when each field communication test device receives response data of the communication test from respective field equipments as the subject of test via the field bus, the field communication test device transmits the response data to the test commanding device via the debug network, and the test commanding device decides whether an operation of the field equipments is normal or abnormal, based on test decide information that is set previously on a basis of the response data acquired from respective field equipments as the subject of test via the respective field communication test devices and the debug network.

According to a seventh aspect of the invention, in the field communication test system according to the fifth or sixth aspect of the invention, the test commanding device transmits a control command to cause respective test devices to execute the communication test, and respective field communication test devices start the communication test based on the control command received via the debug network.

According to the field communication test device and the field communication test system using the same according to the exemplary embodiment of the present invention, a plurality of test devices are caused to cooperate with each other via the debug network based on each test case being set by the test commanding device, and then apply the communication test to respective field equipments connected to the field bus. Therefore, a wide variety of communication tests can be carried out easily, and also a quality of the test subject equipment can be enhanced.

Other features and advantages may be apparent from the following detailed description, the accompanying drawings and the claims.

DETAILED DESCRIPTION

Figure 1:
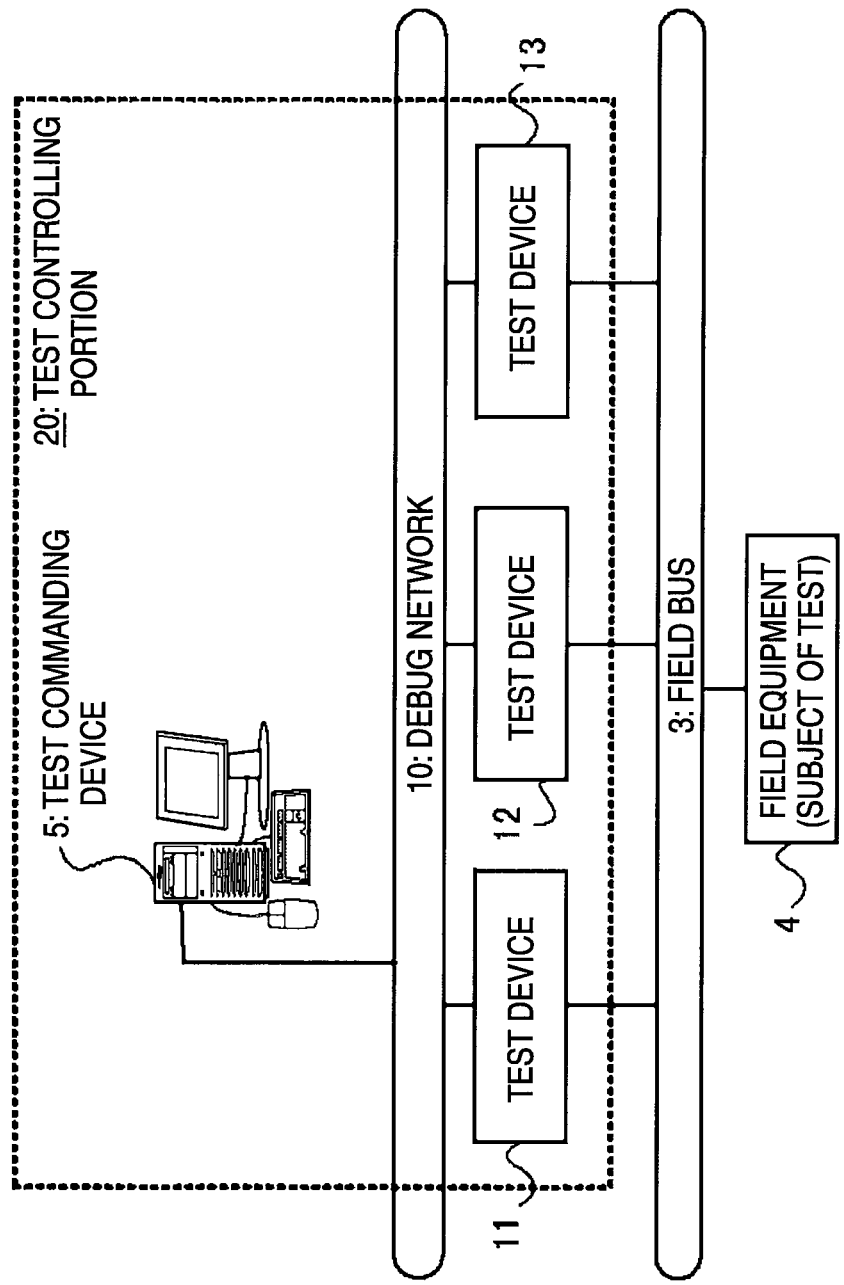
FIG. 1 is a configurative view showing an embodiment of a field communication test system according to the present invention.
Figure 6:
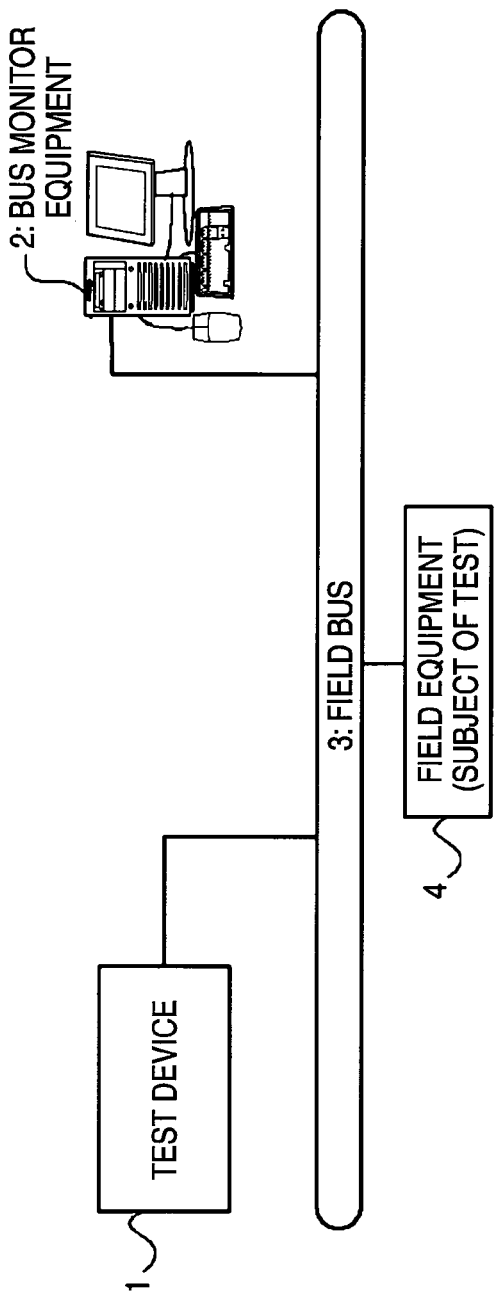
FIG. 6 is a configurative view showing an example of a field communication test system in the related art.
Figure 7:
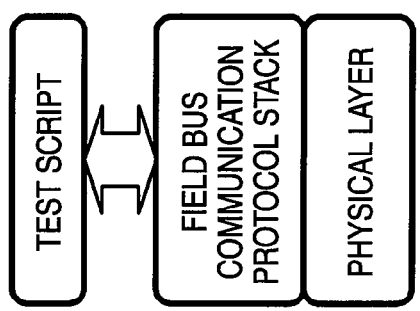
FIG. 7 is an explanatory view of an operation of a test device 1 in FIG. 6.

FIG. 1 is a configurative view showing an embodiment of a field communication test system according to the present invention. The same reference symbols are affixed to the portions that are common to those in FIG. 6, and their explanation will be omitted appropriately hereunder. Differences of FIG. 1 from FIG. 6 reside in that, in place of the test device 1 and the bus monitor equipment 2 in FIG. 1 in the related art, a test controlling portion 20 consisting of a test commanding device 5, a debug network 10, and field communication test devices 11 to 13 (referred simply to as "test devices" hereinafter) carries out the communication test, the test commanding device 5 is connected to the debug network 10, the test commanding device 5 controls a plurality of test devices 11 to 13 being connected in parallel with the debug network 10 and sends out the test data to the field bus 3, and the like.

In FIG. 1, the field communication test system is constructed by the test controlling portion 20 consisting of the test commanding device 5, the debug network 10 as the cable network such as Ethernet (registered trademark), or the like, and the field communication test devices 11 to 13, the field bus 3, the field equipment 4 as the subject of test, and the like.

The test commanding device 5 and the test devices 11 to 13 are connected to the common debug network 10, and these devices can hold mutually the communication via the debug network 10. As the data communication that the test commanding device 5 and the test devices 11 to 13 hold via the debug network 10, the communication using the data in compliance with the protocol for the field equipment may be applied or the data communication executed pursuant to other protocols (e.g., the data communication using the general purpose protocol such as TCP/IP, or the like) may be applied.

Figure 3:
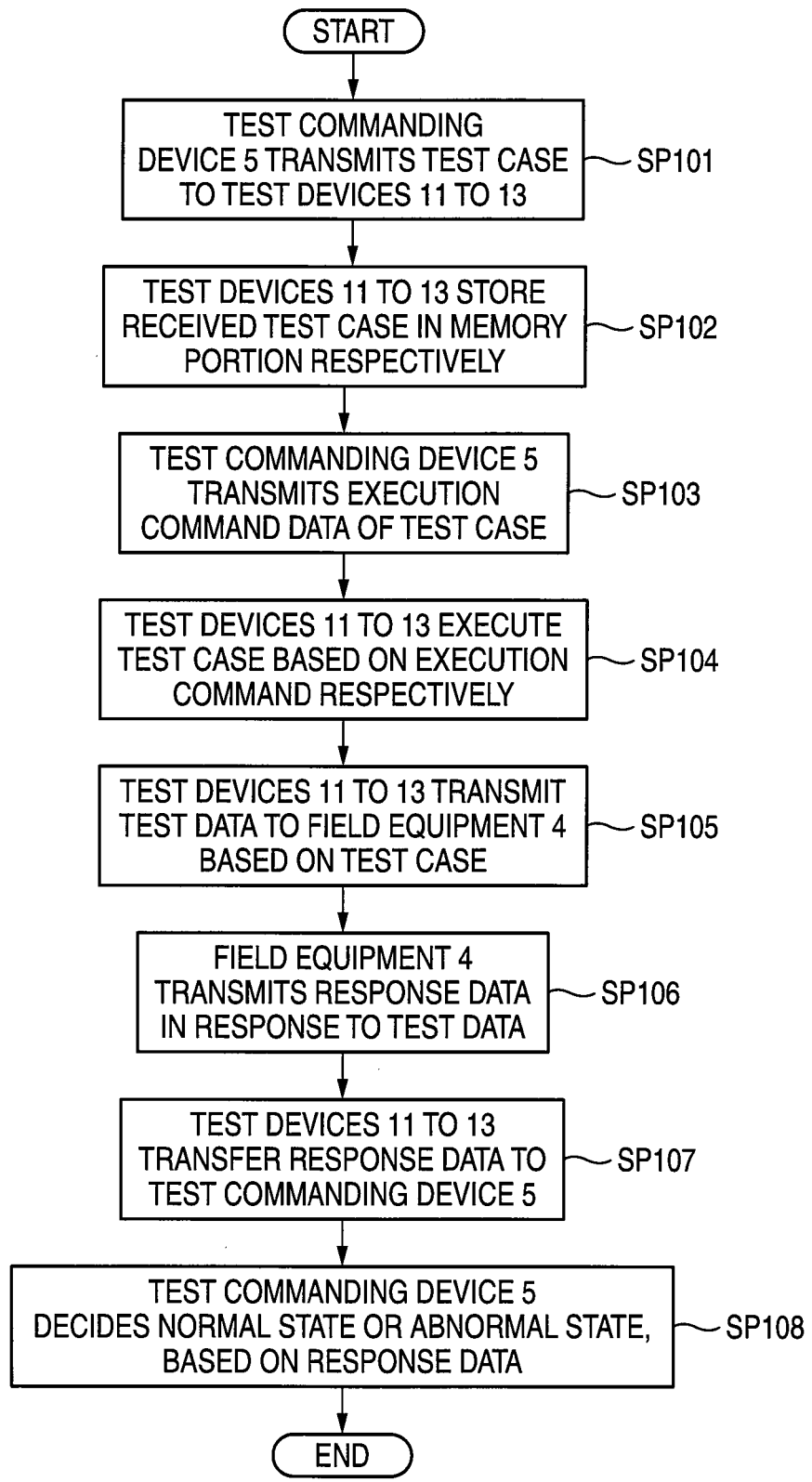
FIG. 3 is an explanatory view of operations of the field communication test system in FIGS. 1 and 2.

Also, the test devices 11 to 13 are connected to the field equipment 4 as the subject of test via the field bus 3, and these devices can hold mutually the communication via the field bus 3. In FIG. 3, three test devices 11 to 13 are illustrated in the field communication test system, but the number of test devices is not particularly limited to this. One test device or more may be connected to the debug network 10 and the field bus 3.

The test commanding device 5 is constructed by a communicating portion such as a network interface, or the like, an operation controlling portion such as CPU, or the like, a storing portion, an inputting portion such as a mouse, a keyboard, or the like, a displaying portion such as LCD, or the like, and others. This communicating portion holds the data communication with the test devices 11 to 13 via the debug network 10. This operation controlling portion issues control commands such as transmission command of the test data to the test devices 11 to 13, execution command of the test case, etc., controls operations of respective functions such as analysis of the data received from the test devices 11 to 13. This storing portion stores the test case or the test data for the communication test, the response data from the field equipment 4, the program needed in operation as the test commanding device 5, the applications, etc. This inputting portion inputs the setting information used to set the test case or the test data. This displaying portion displays the response data, the test data, the communication test result, etc. of the field equipment 4 as the subject of test.

The test case that the test commanding device 5 holds corresponds to the test setting information that recites the preconditions, the operation, the resultant result, the program for the software test, and the like. This test case is used to verify whether or not (the program of) the field equipment 4 as the subject of test is operating correctly. As the test case, for example, following cases may be listed.

(A) The test case to execute the communication test of the subject of test (the field equipment 4) by causing the test devices 11 to 13 to operate as the field equipment that operates normally (normal communication test).

(B) The test case to execute the communication test by transmitting the test data in a particular sequence or at a particular timing in the communication between a plurality of field equipments, or the like to the subject of test (referred to as a "particular sequence/timing test" hereinafter).

(C) The test case to execute the communication test of the subject of test by causing the test devices 11 to 13 to operate as the field equipment whose operation does not meet the specification specified by the protocol (abnormal communication test).

In this case, the abnormal communication test normally indicates the test that is applied to test the operation of the subject of test when the abnormal data produced by the error in fitting the equipment as the data sender, the garbling of data due to the application of noise, or the like is received.

Also, the test that is executed in the abnormal sequence (the contents of communication are correct in this test but the data communication is held in an essentially impossible sequence/order) is contained in the communication test.

Figure 2:
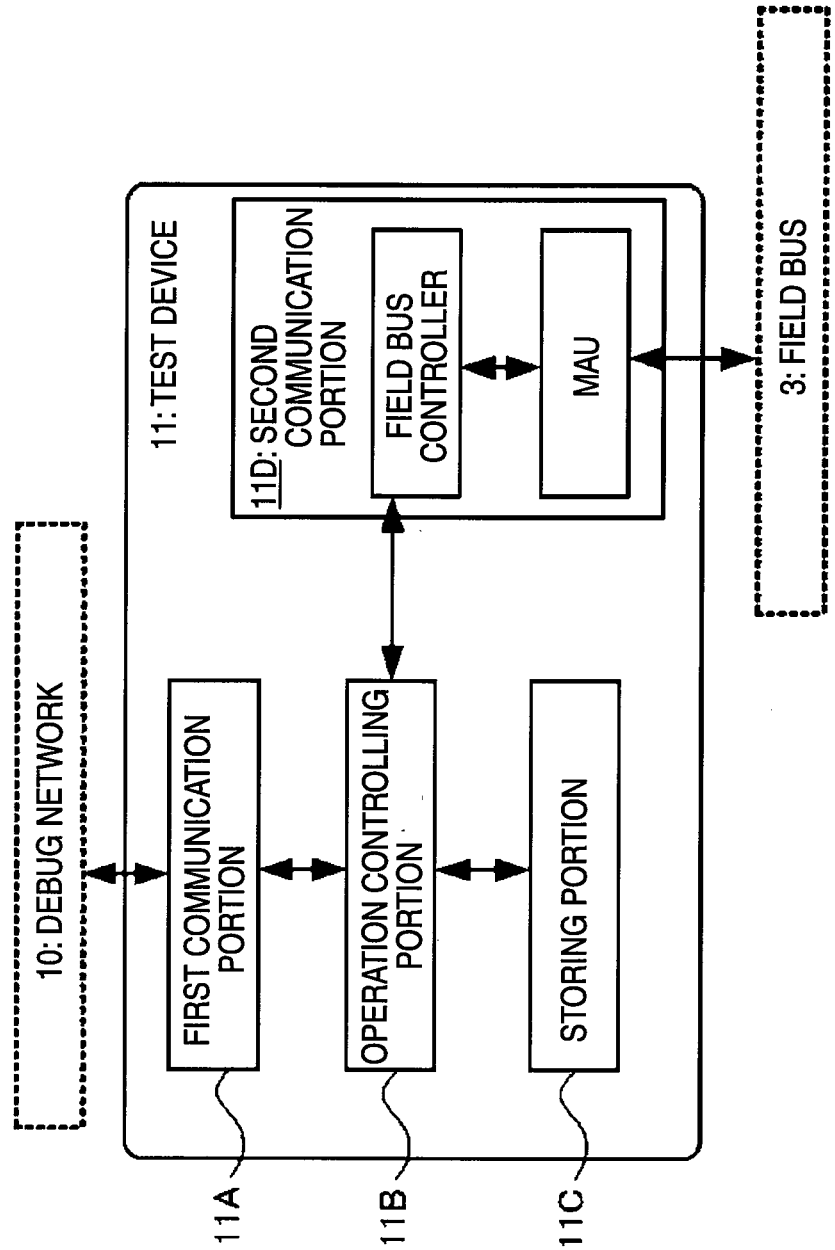
FIG. 2 is a configurative view of a test device 11 in FIG. 1.

FIG. 2 is a configurative view of a concrete example of the test device 11 in FIG. 1. The test device 11 is constructed by a first communication portion 11A such as a network interface, or the like, an operation controlling portion 11B such as CPU, or the like, and the like. This first communication portion 11A holds the data communication with the test commanding device 5 via the debug network 10. This operation controlling portion 11B controls the operations of respective functions such as execution of the test case, transmission of the test data to the field equipment 4 as the subject of test, transfer of the data received from the field equipment 4, etc.

Also, a storing portion 11C such as RAM, ROM, or the like, a second communication portion 11D such as special-purpose communication controller such as field bus I/O controller, or the like, MAU (Media Attachment Unit), FB model (not shown), or the like, and others are provided to the test device 11. This storing portion 11C stores the test case or the test data for the communication test, identification information used to identify the test device 11 (e.g., network address), the program used to operate as the test device 11, the applications, and the like. This second communication portion 11D holds the data communication with the field equipment 4 via the field bus 3.

Also, in the second communication portion 11D of the test device 11, for example, the communication controller monitors a collision of the test data, etc., MAU handles the mutual conversion between the digital signal and the analog signal, and the FB modem transforms the signal into the format that is output to the field bus and inversely transforms the signal on the field bus. Also, the test devices 12, 13 have the similar configuration to that of the test device 11.

FIG. 3 is an explanatory view of operations of the field communication test system shown in FIGS. 1 and 2. In step SP101, the test commanding device 5 transmits the data containing the test case to the test devices 11 to 13 via the debug network 10. As the test case that the test commanding device 5 transmits, the different test case may be transmitted to the test devices 11 to 13 respectively or the identical test case may be transmitted to the test devices 11 to 13.

In step SP102, the test device 11 stores the data containing the test case received via the first communication portion 11A in the storing portion 11C (concretely, writes the data in the test case buffer, or the like). Also, the test devices 12, 13 execute the operation similar to the test device 11.

In step SP103, the test commanding device 5 transmits a control command, which instructs the test devices to execute the test case, to the test devices 11 to 13 via the debug network 10.

In step SP104, the operation controlling portion 11B of the test device 11 executes the test case stored in the storing portion 11C, based on the control command received via the first communication portion 11A. Also, the test devices 12, 13 execute the operation similar to the test device 11.

In step SP105, the operation controlling portion 11B of the test device 11 controls the second communication portion 11D, and transmits the test data to the field equipment 4 as the subject of test based on the test case via the field bus 3. Also, the test devices 12, 13 execute the operation similar to the test device 11.

In this case, the test device 11 holds the communication with the field bus 3 through MAU, the communication controller, or the like provided to the second communication portion 11D.

Also, depending on the test case that is stored in the storing portions of the test devices 11 to 13, the data communication is held between the test devices 11 to 13. For example, when a plurality of field equipments transmit the data sequentially, the synchronization is established between the test devices 11 to 13 to hold the data communication.

In step SP106, when the field equipment 4 as the subject of test receives the test data in the normal communication based on the test data received via the field bus 3, it transmits the data, which are prepared in conformity to the protocol for the field equipment stored in advance in the field equipment 4, to the test devices 11 to 13. In contrast, when such field equipment 4 receives the test data in the abnormal communication, it transmits the data, which are to be transmitted when such field equipment 4 receives the abnormal data, to the test devices 11 to 13.

In step SP107, the test devices 11 to 13 transmit the response data, which is received from the field equipment 4 in response to the test data, to the test commanding device 5 via the debug network 10. In this case, as the response data, the data that are transmitted at any time to the test commanding device 5 from the test devices 11 to 13 via the debug network 10 may be employed.

In step SP108, the test commanding device 5 stores the response data, which is received from the field equipment 4 in response to the test data via the debug network 10, in the storing portion, then decides whether or not the response data corresponds to the data prepared in conformity to the protocol or whether or not the response data corresponds to the previously decided data, and then decides whether the communication operation of the field equipment 4 is in a normal state or in an abnormal sate.

In this case, the test commanding device 5 may acquire the response data of the communication test from the field equipment 4 as the subject of test via the test devices 11 to 13 and the debug network 10, and may store the response data in the storing portion. Also, the test commanding device 5 may convert the acquired data into the display data, and may display the display data in the displaying portion. For example, the response data of the field equipment 4 as the subject of test, the test data corresponding to this, and the result of the communication test (normal, abnormal, others) may be displayed on the displaying portion while correlating with each other.

Next, the operation of the field communication test system in FIGS. 1 and 2 taken when the particular sequential/timing test (test case B) explained above is executed will be explained hereunder.

Figure 4A:
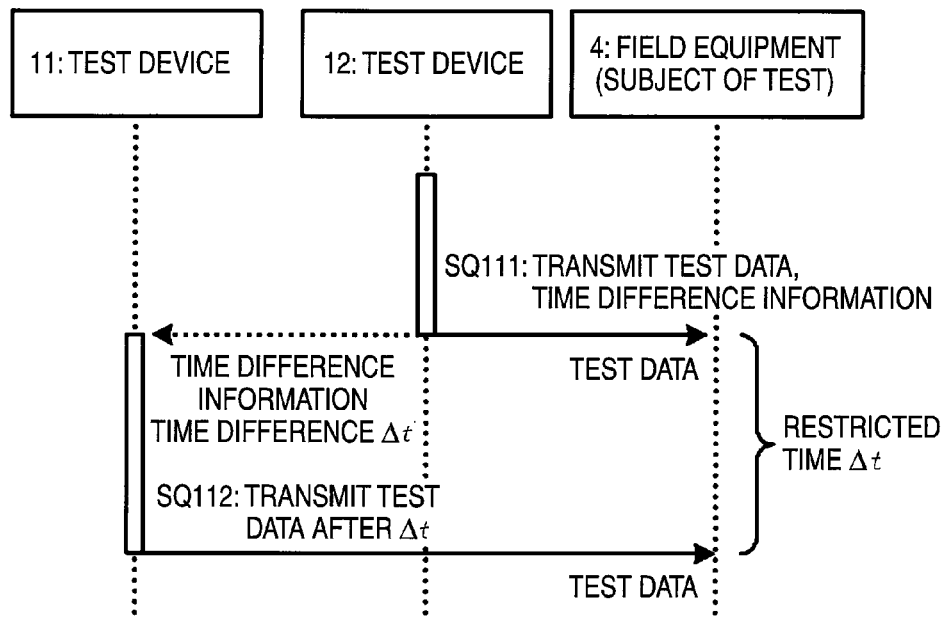
FIGS. 4A to 4C are explanatory views of operations when the field communication test system in FIG. 1 executes a particular sequential/timing test (test case B).
Figure 4B:
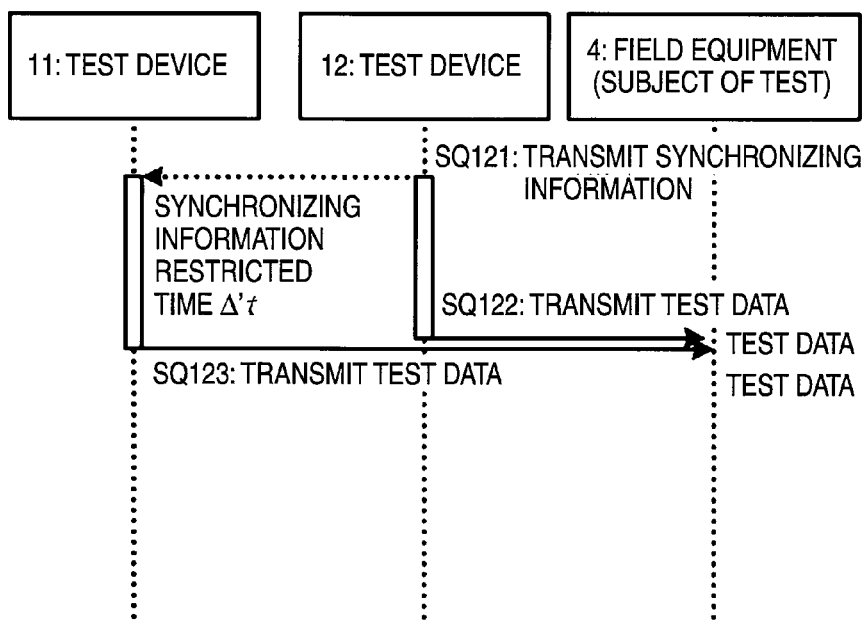
Figure 4C:
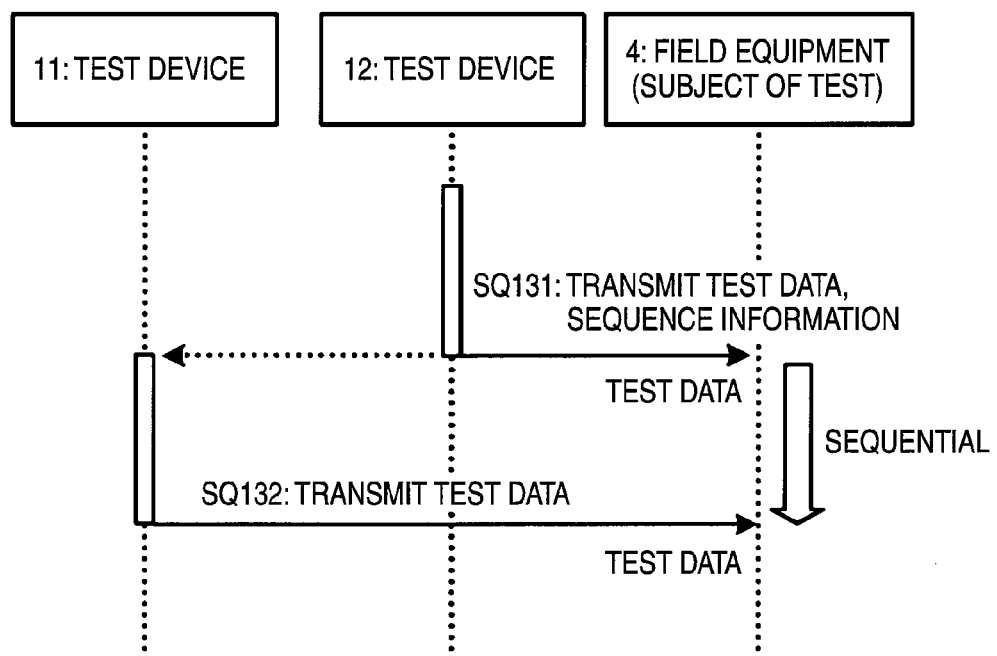

FIGS. 4A to 4C are explanatory views of the operations taken when the field communication test system in FIG. 1 executes the particular sequential/timing test (test case B), wherein FIG. 4A is an explanatory view of the operations in the transmission test with time restriction in which plural pieces of test data are transmitted at a predetermined time interval, FIG. 4B is an explanatory view of the operations in the test in which plural pieces of test data are transmitted simultaneously, and FIG. 4C is an explanatory view of the operations in the sequential transmission executed on the assumption that the data are transmitted sequentially from a plurality of field equipments. In FIGS. 4A to 4C, a broken line indicates the communication held via the debug network 10, and a solid line indicates the communication held via the field bus 3.

In FIGS. 4A to 4C, explanation is made under the assumption that the system is constructed such that the subject of test is the field equipment 4 and two test devices (the test devices 11, 12) are provided and that the test data is transmitted to the field equipment 4 in order of the test device 12 to the test device 11. Also, the sequence of such communication test (the sequence of the test data transmission of respective test devices) can be set to the test case by the test commanding device 5.

In FIG. 4A, when the test with time restriction is carried out, in sequence SQ111, the test device 12 transmits the test data to the field equipment 4 via the field bus 3, and also transmits the data containing time difference information Δt to the test device 11 via the debug network 10.

In sequence SQ112, the test device 11 transmits the test data to the field equipment 4 as the subject of test, based on the received time difference information (Δt) and the test case stored in the storing portion. That is, the test device 11 transmits the test data at a time interval Δt after the transmission of the test device 12.

In this manner, the test device 11 transmits the test data to the field equipment 4 at a time interval Δt based on the time difference information Δt received from the test device 12. Therefore, the transmission test with time restriction in which plural pieces of test data are transmitted at a predetermined time interval can be carried out.

In this case, the time information (Δt) contained in this time difference information may be set in advance by the test commanding device 5.

In FIG. 4B, when the test in which plural pieces of test data are transmitted simultaneously is carried out, in sequence SQ121, the test device 12 transmits in advance synchronizing information, which denotes such an effect that the data is transmitted after a time Δt', to the test device 11 via the debug network 10 to get into synchronization with the test device 11.

In sequences SQ122, SQ123, the test device 11 and the test device 12 get into synchronization mutually by transmitting the test data at the same time after Δt', for example, based on the synchronizing information and the test case, and then transmit the test data simultaneously to the field equipment 4 as the subject of test via the field bus 3.

In this manner, the test devices 11, 12 can carry out the simultaneous transmission test in which the test data is transmitted substantially simultaneously to the field equipment 4 as the subject of test based on the synchronizing information.

In this case, the time information (Δt') contained in this synchronizing information may be set in advance by the test commanding device 5.

In FIG. 4C, when the sequential test is carried out, in sequence SQ131, the test device 12 transmits the test data to the field equipment 4 via the field bus 3, and also transmits the data containing sequence information (for example, the information that is specified to transmit the test data in sequence of the test device 12 to the test device 11) to the test device 11 via the debug network 10.

In sequence SQ132, the test device 11 transmits the test data to the field equipment 4 as the subject of test, based on the received sequence information and the test case stored in the storing portion.

In this manner, the test devices 11, 12 transmit the test data along the sequence decided based on the sequence information. Therefore, such a sequential test can be carried out that the test data is transmitted in sequence of the test device 12 to the test device 11.

In this case, the sequence in which the test data in the communication test of this sequence information are transmitted is set in advance by the test commanding device 5.

Here, in FIGS. 4A to 4C, the test devices 11 to 13 may hold the data communication with the test commanding device 5 via the debug network 10 while they carry out the communication test based on the test case.

As a result, in the field communication test system according to the present invention, a plurality of test devices 11 to 13 are caused to cooperate with each other via the debug network 10 based on each test case being set by the test commanding device 5, and then apply the communication test to respective field equipments connected to the field bus. Therefore, a wide variety of communication tests can be carried out easily, and also a quality of the test subject equipment can be enhanced.

Also, in the field communication test system according to the present invention, the operation of the test device can be specified on a basis of the test case by the test commanding device 5. Therefore, a situation whose reproduction is difficult can be reproduced easily. As a result, the work needed to generate the abnormal communication by superposing the noise on the field bus manually at an adequate timing so as to destroy the communication data, like the related art, can be eliminated.

Also, the test device can generate the abnormal communication. Thus, the behavior of the subject of test exhibited when the abnormal communication takes place at the field bus can be tested effectively.

Also, the data communication can be held between a plurality of test devices via the debug network. Therefore, the communication test can be applied in the complicated situation such as the communication test that is applied at the particular sequential/timing, or the like. As a result, a complicated phenomenon associated with a plurality of equipments can be reproduced, and the trouble occurred only at the particular timing or the trouble occurred only in the particular sequence can be tested.

In the above embodiment, explanation is given on the assumption that the test devices 11 to 13 operate as the field equipment according to the test case. In this case, the test devices may operate as the monitoring device that acquires/collects/displays the data that flows through the field bus 3. All operations of the test device can be specified by forming the test case.

Figure 5:
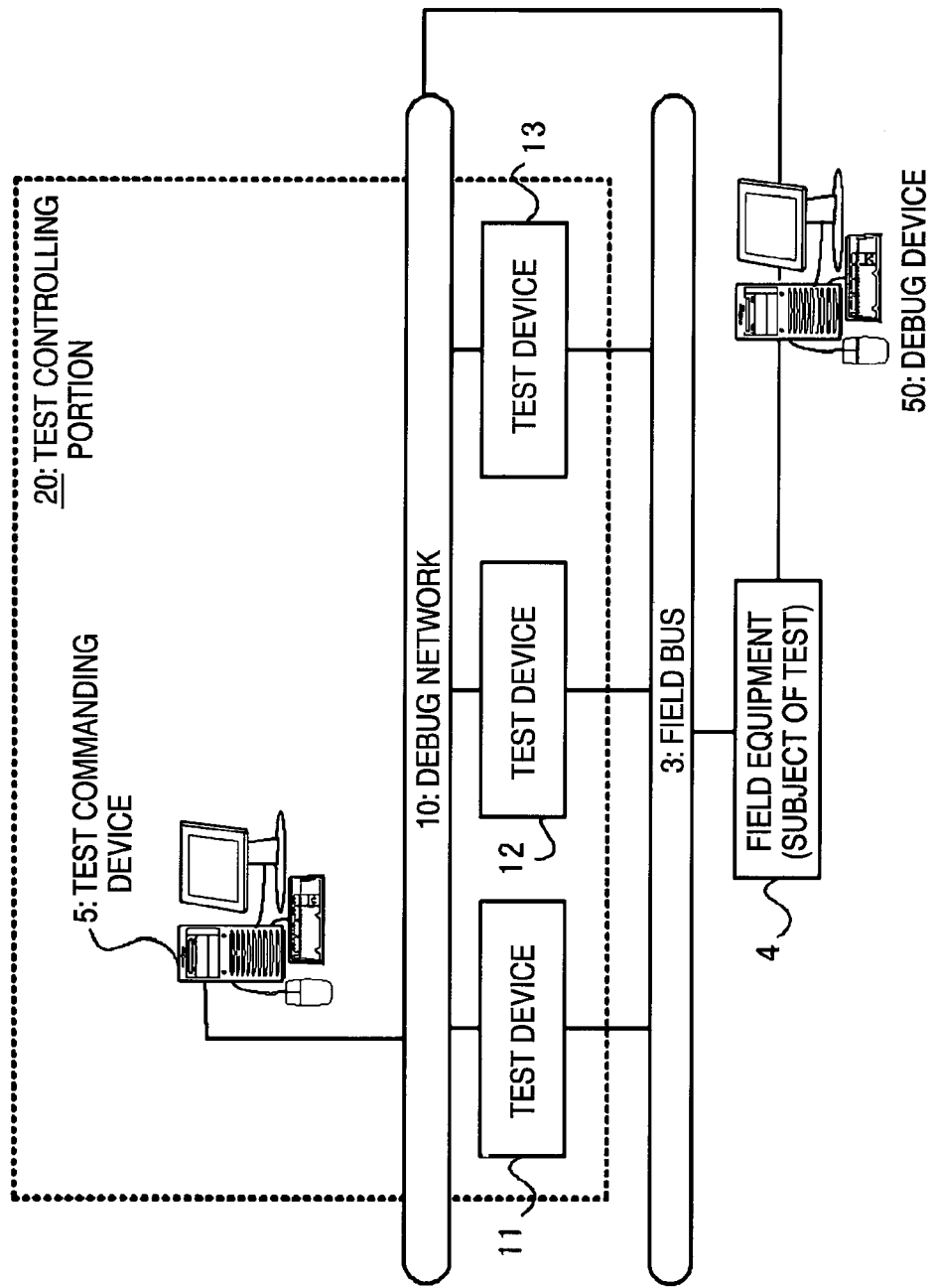
FIG. 5 is a configurative view of a field communication test system equipped with a debug device.

Also, the field communication test system according to the present invention may be equipped with a debug device that executes the debugging by utilizing the result of the communication test obtained by the above embodiment. FIG. 5 is a configurative view of a field communication test system equipped with a debug device. The same reference symbols are affixed to the portions common to those in FIG. 1, and their explanation will be omitted appropriately.

In FIG. 5, a debug device 50 such as ICE, or the like can refer to internal variables of the field equipment 4 as the subject of test. This debug device 50 is connected to the field equipment 4 as the subject of test and the debug network 10 respectively.

The debug device 50 acquires internal data of the field equipment 4 as the subject of test, and executes the test of the internal variables of the field equipment 4. Also, the debug device 50 generates/sets the test data and the test case corresponding to the internal states of the field equipment 4 as the subject of test, by communicating with the test devices 11 to 13.

The test devices 11 to 13 applies the communication test to the field equipment 4, based on the test case that is set by the debug device 50. The debug device 50 executes the debugging based on the results of various communication tests obtained from the field equipment 4.

In this manner, the debug device 50 executes the debugging based on the results of the communication tests that are carried out based on the test data and the test case that corresponds to the internal variables and the internal states. Therefore, a debugging efficiency can be improved.

Also, the use of the field bus is assumed in the present system, but the present invention can be applied to other common networks. In this case, when the present invention is applied to other common networks, the network adaptable to the system including the test devices must be employed.

Also, the operation controlling portion 11B of the test device 11 of the present invention may execute peculiar operations, for example, may control the overall test device 11 by starting OS stored in the storing portion 11C, or the like and reading/executing the program stored on this OS, may apply the communication test based on the test case being set by the test commanding device 5 while cooperating with other test device, or the like, and others.

At this time, the storing portion 11C develops the program and the application executed by the operation controlling portion 11B in the program storing area, and stores temporarily the input data and the data such as the processed results produced upon executing the program and the application, and the like in the working area.

As described above, in the field communication test device according to the present invention and the field communication test system using the same, a plurality of test devices 11 to 13 carry out the communication test in cooperation with each other, based on each test case being set by the test commanding device 5. Therefore, a wide variety of communication tests can be carried out easily, and also a quality of the test subject equipment can be enhanced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A field communication test device for testing a plurality of field equipment configured for disposition within a field communication system comprising:
   a field bus communication portion coupled to a field bus, to which a plurality of field equipment are connected,
   a debug network communication portion connected to a debug network, which is different from the field bus, to apply a communication test to respective field equipment, and
   at least one transmission/reception unit whereby the field communication test device (1) transmits/receives cooperation data, which is used to apply the communication test in cooperation with other field communication test devices provided on the field bus to/from said other field communication test devices, via said debug network communication portion and the debug network, and (2) transmits test data for the communication test to the respective field equipment via said field bus communication portion and the field bus based on the cooperation data.

2. A field communication test device for testing a plurality of field equipment comprising:
   a first communication portion for connecting to a debug network to apply a communication test to respective field equipment;
   a second communication portion for coupling to a field bus, to which a plurality of field equipment are connected;
   wherein, said first communication portion holds data communication with the other field communication test devices via the debug network, and said second communication portion holds data communication for the communication test with respective field-equipment via the field bus,
   at least one transmission/reception unit whereby the field communication test device (1) transmits/receives cooperation data, which is used to apply the communication test in cooperation with other field communication test devices provided on the field bus to/from said other field communication test devices, via the first communication portion and the debug network, and (2) transmits test data for the communication test to the respective field equipment via the second communication portion and the field bus based on the cooperation data,
   a storing portion which stores a test case used to apply at least any one of a normal communication test in which the field communication test device operates as the field equipment that operate normally and transmits the test data for the communication test, a particular sequence/timing test in which the test data for the communication test is transmitted in a sequence or at a predetermined timing in communications between the plurality of field equipment, and an abnormal communication test in which the field communication test device operates as the field equipment that operate not to meet the specification specified in advance by the protocol of each field equipment and transmits the test data for the communication test, and
   an operation controlling portion which transmits/receives the cooperation data by controlling the first communication portion in accordance with each test case, and transmits data for the communication test to respective field equipment as a subject of test by controlling the second communication portion based on the cooperation data.

3. A field communication test device according to claim 2, wherein the operation controlling portion transmits/receives the cooperation data containing at least any one of time difference information, sequence information in which a transmitting sequence of test data is decided, and synchronizing information by controlling the first communication portion such that the field communication test device applies the particular sequence/timing test while cooperating with the other field communication test device,
   and the operation controlling portion transmits the test data at a time interval while cooperating with the other field communication test device based on the time difference information received via the debug network, and/or transmits the test data while cooperating with the other field communication test device based on the sequence information received via the debug network, and/or transmits the test data at a same timing while cooperating with the other field communication test device based on the synchronizing information received from the other field communication test device via the debug network.

4. A field communication test system comprising:
a field bus;
a debug network; and
at least one field communication test device, said test device comprising:
a first communication portion for connecting to said debug network to apply a communication test to respective field equipment;
a second communication portion for coupling to said field bus, to which a plurality of field equipment are connected;
wherein, said first communication portion holds data communication with the other field communication test devices via the debug network, and said second communication portion holds data communication for the communication test with respective field-equipment via the field bus,
at least one transmission/reception unit whereby the field communication test device (1) transmits/receives cooperation data, which is used to apply the communication test in cooperation with other field communication test devices provided on the field bus, via the first communication portion and the debug network, and (2) transmits test data for the communication test to the respective field equipment via the second communication portion and the field bus based on the cooperation data,
a storing portion which stores a test case used to apply at least any one of a normal communication test in which the field communication test device operates as the field equipment that operate normally and transmits the test data for the communication test, a particular sequence/timing test in which the test data for the communication test is transmitted in a sequence or at a predetermined timing in communications between the plurality of field equipment, and an abnormal communication test in which the field communication test device operates as the field equipment that operate not to meet the specification specified in advance by the protocol of each field equipment and transmits the test data for the communication test, and
an operation controlling portion which transmits/receives the cooperation data by controlling the first communication portion in accordance with each test case, and transmits data for the communication test to respective field equipment as a subject of test by controlling the second communication portion based on the cooperation data.

5. A field communication test system according to claim 4, further comprising:
a test commanding device which sets a plurality of test cases of the communication test, and transmits data containing the test cases to respective field communication test devices via the debug network.

6. A field communication test system according to claim 5, wherein, when each field communication test device receives response data of the communication test from respective field equipment as the subject of test via the field bus, the field communication test device transmits the response data to the test commanding device via the debug network,
and the test commanding device decides whether an operation of the field equipment is normal or abnormal, based on test decide information that is set previously on a basis of the response data acquired from respective field equipment as the subject of test via the respective field communication test devices and the debug network.

7. A field communication test system according to claim 5, wherein the test commanding device transmits a control command to cause respective test devices to execute the communication test, and
respective field communication test devices start the communication test based on the control command received via the debug network.

8. A field communication test system according to claim 6, wherein the test commanding device transmits a control command to cause respective test devices to execute the communication test, and
respective field communication test devices start the communication test based on the control command received via the debug network.

* * * * *